US012679385B2

(12) United States Patent
Badouin

(10) Patent No.: US 12,679,385 B2
(45) Date of Patent: Jul. 14, 2026

(54) METHOD FOR CHECKING THE FITNESS OF A DRIVER TO DRIVE A MOTOR VEHICLE, AND MOTOR VEHICLE

(71) Applicant: CARIAD SE, Wolfsburg (DE)

(72) Inventor: David Alexander Badouin, Ingolstadt (DE)

(73) Assignee: Cariad SE, Wolfsburg (DE)

( * ) Notice: Subject to any disclaimer, the term of this patent is extended or adjusted under 35 U.S.C. 154(b) by 101 days.

(21) Appl. No.: 18/555,496

(22) PCT Filed: Apr. 7, 2022

(86) PCT No.: PCT/EP2022/059177
§ 371 (c)(1),
(2) Date: Oct. 13, 2023

(87) PCT Pub. No.: WO2022/218788
PCT Pub. Date: Oct. 20, 2022

(65) Prior Publication Data
US 2024/0199031 A1 Jun. 20, 2024

(30) Foreign Application Priority Data

Apr. 14, 2021 (DE) ......................... 102021109329.5

(51) Int. Cl.
*B60W 40/08* (2012.01)
*B60W 50/08* (2020.01)
*B60W 50/14* (2020.01)

(52) U.S. Cl.
CPC .......... *B60W 40/08* (2013.01); *B60W 50/082* (2013.01); *B60W 50/14* (2013.01);
(Continued)

(58) Field of Classification Search
CPC .... B60W 40/08; B60W 50/082; B60W 50/14; B60W 2040/0818; B60W 2040/0872; B60W 2050/143
(Continued)

(56) References Cited

U.S. PATENT DOCUMENTS

| | | | |
|---|---|---|---|
| 10,471,969 B1 | 11/2019 | Laserra Lima | |
| 11,040,722 B2 | 6/2021 | Miyahara et al. | |

(Continued)

FOREIGN PATENT DOCUMENTS

| | | |
|---|---|---|
| DE | 112016007311 T5 | 7/2019 |
| DE | 102018210375 A1 | 1/2020 |

(Continued)

*Primary Examiner* — Naomi J Small
(74) *Attorney, Agent, or Firm* — Seed Intellectual Property Law Group LLP

(57) ABSTRACT

The invention relates to a method for checking the fitness of a driver to drive a motor vehicle (10) and to a motor vehicle (10) for carrying out a method of this kind. The method comprises the following steps: identifying (S1) a transition signal (38) from a highly automated driving mode to a less automated driving mode; receiving (S2) a request signal (40) and outputting (S3) a request (42) characterized by the transmitted request signal (40) in the motor vehicle (10); capturing (S4) a response signal (44) which comprises a response (46) of the driver to the request (42); determining (S5) a fitness-to-drive value (48) which quantifies the driver's fitness to drive by evaluating the response signal (44) while applying a specified evaluation criterion (50), wherein it is checked whether the response signal (44) describes an expected response (52) associated with the request signal (40); checking (S6) whether the fitness-to-drive value (48) determined is greater than a specified fitness-to-drive limit value (54); and, if this is the case, permitting (S7) a manual
(Continued)

Figure 1:
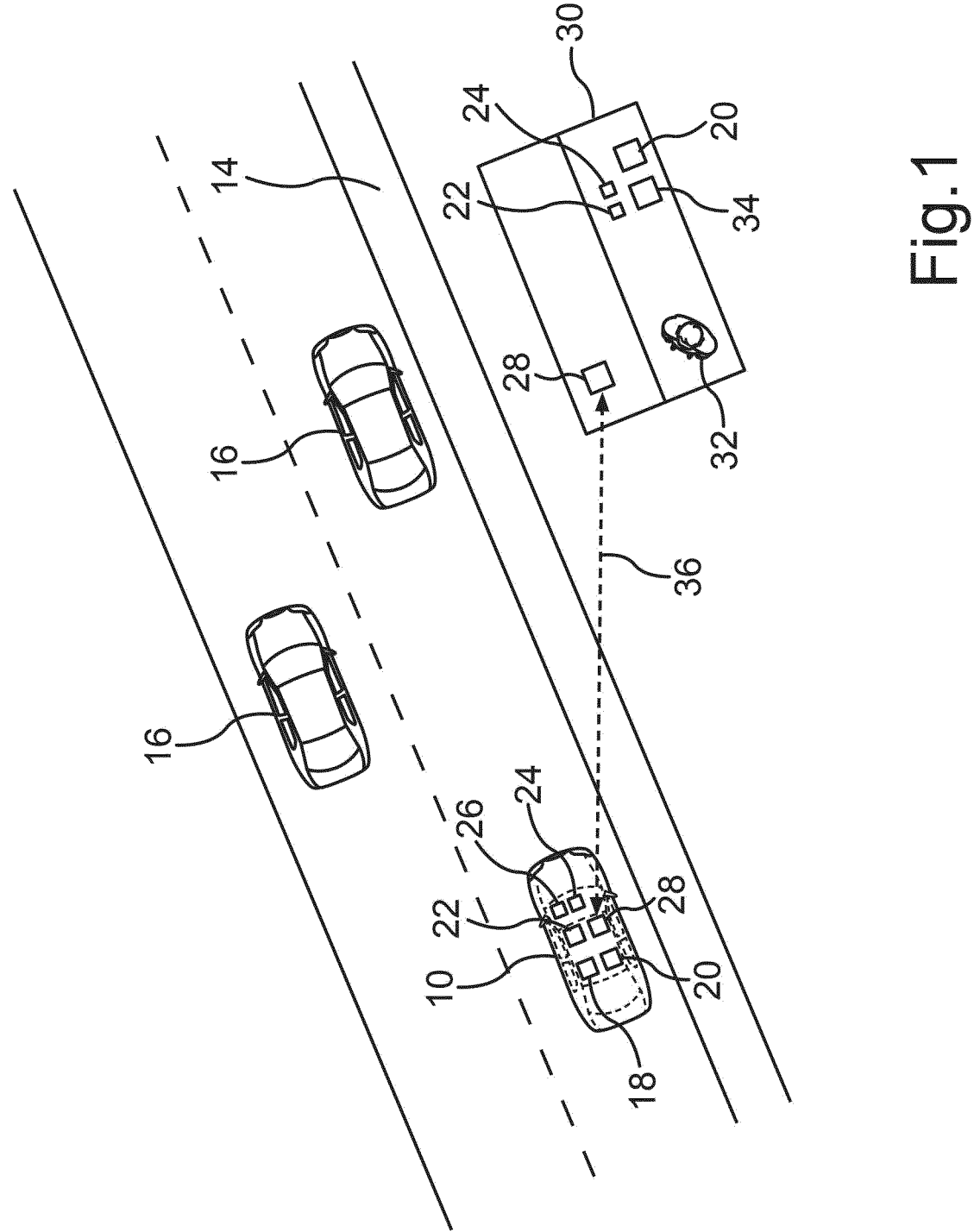

intervention by the driver in the longitudinal and/or lateral control of the motor vehicle (10).

14 Claims, 2 Drawing Sheets

(52) U.S. Cl.
CPC ............... *B60W 2040/0818* (2013.01); *B60W 2040/0872* (2013.01); *B60W 2050/143* (2013.01)

(58) Field of Classification Search
USPC ......................................................... 340/576
See application file for complete search history.

(56) References Cited

U.S. PATENT DOCUMENTS

| | | | | |
|---|---|---|---|---|
| 11,422,551 B2 * | 8/2022 | Swan ...................... | A61B 5/742 |
| 2016/0362000 A1 | 12/2016 | Brewer et al. | |

| | | | | |
|---|---|---|---|---|
| 2017/0110022 A1 * | 4/2017 | Gulash ...................... | G09B 5/06 |
| 2019/0056731 A1 | 2/2019 | Westbrook | |
| 2019/0276047 A1 * | 9/2019 | Suzuki ...................... | G08B 3/10 |
| 2019/0300034 A1 * | 10/2019 | Molne ................... | B61L 25/021 |
| 2019/0310630 A1 * | 10/2019 | Taveira ................ | G05D 1/0061 |
| 2020/0017118 A1 * | 1/2020 | Miyahara .............. | B60W 50/14 |
| 2020/0064833 A1 * | 2/2020 | Fox ................... | B60W 60/0057 |
| 2021/0039681 A1 * | 2/2021 | Tarao ..................... | B60K 28/06 |
| 2021/0061312 A1 * | 3/2021 | Wang ............... | B60W 60/0059 |
| 2021/0197832 A1 | 7/2021 | Matsunami | |
| 2024/0199031 A1 * | 6/2024 | Badouin .............. | B60W 40/08 |
| 2024/0362931 A1 * | 10/2024 | Katz ...................... | G06V 40/20 |

FOREIGN PATENT DOCUMENTS

| | | | |
|---|---|---|---|
| DE | 102019135180 A1 | 7/2020 |
| EP | 3539840 A1 | 9/2019 |

* cited by examiner

METHOD FOR CHECKING THE FITNESS OF A DRIVER TO DRIVE A MOTOR VEHICLE, AND MOTOR VEHICLE

The disclosure relates to a method for checking a fitness to drive of a driver of a motor vehicle as well as to a motor vehicle, which is formed to perform such a method.

Often, a motor vehicle is designed for at least partially autonomous driving of the motor vehicle. In context of an automated operation of the motor vehicle, various levels of the automation are distinguished, based on which different degrees of the automation between a drive without automation up to full automation can be distinguished. Such levels can, for example, be taken from the standard SAE J3016, which classifies autonomous driving in six levels.

In a driving mode with a limited automation, such as, for example, a driving mode according to SAE level 3, all of the aspects of a dynamic driving task are executed by an automated driving system, but it is expected that a driver of the motor vehicle responds to a request for intervening at any time and then can optionally actually intervene in a longitudinal and/or lateral guidance of the motor vehicle. In contrast thereto, in a highly automated driving mode, such as, for example, a driving mode according to SAE level 4, this requirement to the driver does not exist such that the motor vehicle can be controlled in fully automated manner without human response.

It is possible that the motor vehicle traverses a region in a drive in the highly automated driving mode, in which the highly automated driving mode is, for example, not permitted such that a downgrade to an only limited automated driving mode is required. This downgrade can, for example, occur upon a temporary termination of a communication link of the motor vehicle to a facility external to vehicle. Alternatively or additionally thereto, the downgrade can be caused by a configuration of a current driving route, for example, because prerequisites required for the highly automated driving mode to a driving environment of the current driving route are no longer satisfied.

Before the downgrade from the highly automated driving mode to the limited automated or an even less automated driving mode, such as, for example, a partially automated driving mode according to SAE level 2 or a driving mode based on a driver assistance system according to SAE level 1, is effected, however, it should be ensured that the driver of the motor vehicle is currently actually suitable to again at least partially take over the control of the motor vehicle. Before an intervention of the driver in the longitudinal and/or lateral guidance of the motor vehicle after the downgrade is permitted, it is therefore reasonable to perform a check of the fitness to drive of the driver.

In DE 10 2019 135 180 A1, a method for restricting an autonomous vehicle operation in response to a recognition of a vehicle occupant impairment is described. A degree of impairment of the vehicle occupant is captured and evaluated in the motor vehicle, for example, by way of an alcohol breath tester, an infrared sensor or an eye scanner.

US 2017/0110022 A1 shows how an autonomously driving vehicle can change from an autonomous driving mode into a driving mode, which requires manual intervention. Hereto, an audio sample of a driver of the vehicle is captured and compared to a recorded audio sample of the driver to determine whether or not the driver is ready to now take over major manual requirements to a guidance of the vehicle.

US 2019/0056731 A1 shows a method, by which it can be prevented that a vehicle changes from an autonomous to a manual driving mode, wherein physiological sensor data is taken into account to assess whether or not a driver is fit to drive at the current point of time.

It is the object of the disclosure to provide a solution, by way of which a fitness to drive of a driver of a motor vehicle can be reliably checked.

DISCLOSURE

The disclosure is based on the realization that a deceleration of the motor vehicle to a stop should occur if the prerequisites for operating the motor vehicle in a highly automated driving mode do no longer exist. Therefore, it is reasonable to perform a transfer from the highly automated driving mode to a driving mode less automated compared thereto without deceleration of the motor vehicle to the stop. However, it has to be ensured hereto that the driver is actually fit to drive at a current point of time.

Hereto, the methods known from the prior art usually resort to sensor data captured in the motor vehicle and compare it to recorded data, such as, for example, a recorded audio sample according to the teaching of US 2017/0110022 A1. However, in order to be able to perform a determination of the fitness to drive as reliable and accurate as possible, it is advantageous to directly check the cognitive abilities of the driver.

As the fitness to drive in terms of the disclosure, the mental, physical and particularly the ability of a person not impaired by medicaments, alcohol or other intoxicants to safely guide a motor vehicle in the traffic is understood. Thus, the fitness to drive is a current characteristic of the driver and describes the current readiness and ability of the driver related to situation to properly control the motor vehicle. In contrast thereto, the unfitness to drive is the inability of the driver to safely guide the motor vehicle at a current point of time. By fitness to drive, thus, not the general physical, mental suitability and suitability in character of the driver to guide the motor vehicle is understood.

The method according to the disclosure for checking the fitness to drive of the driver of a motor vehicle is suitable to recognize a mentally absent driver, who, for example, caused by consumption of medicaments or intoxicants and/or fatigue, is currently in a state, in which he is to be assessed as not fit to drive and thus as unfit to drive. Thereto, the method according to the disclosure comprises the following steps:

In a step a, identifying a transition signal from an at least highly automated driving mode of the motor vehicle to a driving mode less automated compared thereto is effected. Thus, the transition signal includes the information that a change from the at least highly automated driving mode to the less automated driving mode has been activated. For example, the motor vehicle can currently drive in a driving mode according to SAE level 4 or higher, in which both the longitudinal and the lateral guidance of the motor vehicle are autonomously effected and no driving tasks at all are taken over during the drive by the driver of the motor vehicle, that is by the person, who is sitting on a driver's seat of the motor vehicle and principally has the possibility of manually taking over the longitudinal and/or lateral guidance of the motor vehicle. Thus, it is not expected from the driver during the drive that he optionally intervenes in the longitudinal and/or lateral guidance of the motor vehicle. During such a drive, the driver can, for example, sleep or pursue any other activity within the motor vehicle. In the driving mode less automated compared thereto, such as, for example, a driving mode according to SAE level 3, however, the driver is more severely involved in the operation of the motor vehicle, since it is expected from him that he can intervene in a longitudinal and/or lateral guidance at any time. In such a less automated driving mode, thus, it is expected that the driver is always mentally present and thus fit to drive. The transition signal from the highly automated driving mode to the driving mode less automated compared thereto is, for example, identified whenever a restriction of the availability of the highly automated driving mode occurs due to a currently traveled route section, for example, depending on a configuration of a driving route currently traveled by the motor vehicle.

Preferably, the transition signal is identified in time before an actually required driving mode change from the at least highly automated driving mode to the driving mode less automated compared thereto, such that a preset period of time is available, during which the fitness to drive of the driver can be checked. For example, this period of time is two minutes, one minute, 50 seconds, 30 seconds, 20 seconds, ten seconds or five seconds. In particular, the period of time is in a range from two minutes to five seconds.

If the transition signal has been identified, receiving a request signal as well as outputting a request characterized by the transferred request signal in the motor vehicle by way of an output device are effected in a step b. Thus, the received request signal includes a certain question, which is output to the driver within the motor vehicle. The output device provided hereto can be a component of the motor vehicle itself and/or a mobile terminal of the driver positioned in the motor vehicle, for example, a smartphone. The request signal can be emitted by a component of the motor vehicle. Alternatively or additionally thereto, it can be provided by an external facility, that is by a facility arranged outside of the motor vehicle, and be transferred to the motor vehicle. The motor vehicle or the output device comprises a corresponding communication interface hereto. The request can, for example, include a concretely formulated request, for example, the question: "Which day of the week is today?". This request, which is received with the request signal, is output in the motor vehicle, which can, for example, be effected by an audio output of the request.

In a next method step c, capturing a response signal, which describes a response of the driver to the output request, is effected. This capture is effected by way of a capturing device. The capturing device can be a component of the motor vehicle and/or a device positioned in the motor vehicle, such as, for example, the mobile terminal of the driver. For example, the response signal can be present as an audio signal such that the driver can respond to the previously output request with a corresponding response sentence or a response word. In case of the exemplarily mentioned request, the driver can, for example, acoustically mention a today's day of the week, wherein this response is captured as the response signal by way of, for example, a microphone device of the motor vehicle as the capturing device.

In a method step d, the fitness to drive of the driver is determined in that a fitness-to-drive value quantifying the fitness to drive of the driver is determined. This is effected by evaluating the captured response signal while applying a preset evaluation criterion, wherein it is checked if the captured response signal describes an expected response associated with the received request signal. In case of the exemplarily mentioned question, namely, there exists exactly one expected response, which is regarded as the correct response. Thus, in this example, a very concrete response to the request would be expected from the driver of the motor vehicle, wherein the response signal is checked to the effect whether or not the expected correct response is actually described by the response signal. Herein, it is possible by way of the evaluation criterion to also read the correct response from a, for example, more extensive response sentence, for example, if the driver responds to the above mentioned question: "As far as I know, today is Monday". The correct response can also be read from this response, since the evaluation criterion comprises rules, according to which the response signal of the driver is converted into text and it is in turn examined for its semantic meaning. Hereby, it is possible that an arbitrarily formulated response of the driver is categorized as a response, which corresponds to the expected response, if this response of the driver actually responds to the previously stated request.

For example, the fitness-to-drive value can take either the value zero or the value one. With a fitness-to-drive value of one, the fitness to drive of the driver then, for example, would exist, that is the captured response signal describes the expected response associated with the received request signal. In contrast thereto, in case of a non-coincidence of the captured response signal with the expected response, the fitness-to-drive value zero can be determined, which includes the information that the driver is regarded as unfit to drive.

The determination of the fitness-to-drive value is based on the idea that a drowsy person or also a person, who is currently under the influence of medicaments or intoxicants, is not capable of providing a response signal with high probability, which gets associated a fitness-to-drive value while applying the evaluation criterion, which is indicative of a fitness to drive of the driver. Rather a, for example, incorrect response to the request then has to be expected such that the response signal does not describe the expected response.

In a method step e, it is now checked if the determined fitness-to-drive value is greater than a preset fitness-to-drive limit value. In case of differentiation of the fitness-to-drive value between the values zero and one, the fitness-to-drive limit value can, for example, be at one, such that only if a fitness to drive of the driver has been recognized, the check in method step e provides a positive result.

Alternatively, the fitness-to-drive value can take any value between zero and one such that a detailed gradation is, for example, effected depending on the evaluation criterion and the configurations thereof.

In method step d, an unfitness to drive of the driver can, for example, be recognized with 20 percent probability such that the fitness-to-drive value is, for example, at 80 percent. The preset fitness-to-drive limit value can then, for example, be at 50 percent such that the check in method step e would provide a positive result with the observed fitness-to-drive value of 80 percent. The reduction of the fitness-to-drive value to 80 percent can, for example, occur by hesitation of the driver in its response since this hesitation can, for example, be interpreted as a current unfitness to drive of the driver existing at least to a certain degree, if this is provided as a corresponding rule of the evaluation criterion.

If the fitness-to-drive value is greater than the preset fitness-to-drive limit value, that is the check in the method step e has turned out to be positive, permission of a manual intervention of the driver in a longitudinal and/or lateral guidance of the motor vehicle is effected in a method step f. Thus, with positive evaluation of the fitness to drive of the driver, the change from the at least highly automated driving mode to the driving mode less automated compared thereto is effected. By permitting the manual intervention of the driver in the longitudinal and/or lateral guidance of the motor vehicle, thus, the prerequisites of, for example, the driving mode according to SAE level 3 are satisfied such that the desired change of the driving mode can be successfully performed without deceleration of the motor vehicle to the stop being first required. In case of a determined unfitness to drive of the driver, however, the deceleration of the motor vehicle to the stop, for example, would have been required, wherein the manual intervention of the driver in the longitudinal and/or lateral guidance of the motor vehicle would have been disabled. Disabling the manual intervention of the driver can be only temporarily set, thus, for example, only for a preset period of time, for example, a few minutes.

With the described method, it is reliably checked if the driver is currently fit to drive and thus should be allowed to intervene in the longitudinal and/or lateral guidance or if he is currently not fit to drive and thus is unfit to drive and therefore the intervention in the longitudinal and/or lateral guidance of the motor vehicle should be denied to him. By stating a concrete question, that is by the request, and the expected response associated with the request, it is possible that the current cognitive abilities of the driver are checked in simple and fast manner such that it can be reliably recognized if he is currently mentally present or absent. Herein, a connection in natural speech is preferably established such that both the request and the response signal of the driver are, for example, present as respective audio signals and thus a pleasant conversational situation arises for the driver, which nevertheless serves for reliably checking the fitness to drive of the driver.

Forms of configuration, by which additional advantages arise, also belong to the disclosure.

In an advantageous form of configuration, it is provided that the transition signal is automatically provided considering a current driving route. Thus, for example, by way of a navigation system of the motor vehicle and/or a sensor device of the motor vehicle for capturing an environment of the motor vehicle, it can be determined on which current driving route the motor vehicle is on the way in highly automated manner. Herein, it can additionally or alternatively be checked whether or not the at least highly automated driving mode is enabled for a future route section, to which the motor vehicle approaches on the current driving route. Herein, the current driving route can, for example, be taken from a current driving route of the motor vehicle, which is, for example, recorded in the navigation system of the motor vehicle. In case of such an effected or upcoming change of the current driving route to a driving route, on which the highly automated driving mode can no longer be activated, the transition signal is autonomously generated by the motor vehicle without assistance of the driver. The automatic provision can be effected by way of a control device of the motor vehicle. The automatic provision of the transition signal is preferably effected by a preset period of time before the actual travel on the driving route, in which only a less automated drive is possible, such that there remains sufficient time for performing the method steps b to f.

Alternatively or additionally thereto, it is provided that the transition signal is manually activated by way of an operating element in the motor vehicle. The operating element is, for example, provided as a rotary pushbutton, knob, button and/or element on a touch-sensitive display surface, such as, for example, a touch display, in the motor vehicle. For example, the driver can indicate by operating the operating element that he wishes to again actively take over the longitudinal and/or lateral guidance of the motor vehicle since he, for example, wishes to change from the currently highly automated driving mode into a driving mode, in which he can and/or has to exert influence on the longitudinal and/or lateral guidance of the motor vehicle. Thus, the transition signal can be manually activated and thus be provided in the motor vehicle by a corresponding confirmation of a driver wish by the driver of the motor vehicle by way of the operating element.

Thus, various triggers of the method for checking the fitness to drive of the driver of the motor vehicle are possible. In particular, it is allowed to the driver of the motor vehicle to initiate the check of the fitness to drive at any point of time, namely whenever he wishes to actively change from the currently highly automated driving mode to the driving mode less automated compared thereto.

According to a further form of configuration, it is provided that the request asks for information characterizing a current point of time. Thus, it can, for example, be asked for a day of the week associated with the current day. Alternatively or additionally thereto, a clock time, a time of day, a month, a date, a season and/or a year can be requested. This type of request is based on the realization that a mentally absent person often has difficulties in mentioning a current point of time and therefore already shows difficulties of giving the expected response as the response to a possibly simply seeming question for the current day of the week. Thus, relatively simple requests capable of being responded to without professional knowledge and pre-knowledge are provided, which can principally be responded to by any driver at any time.

Alternatively or additionally, it can be provided that the request includes a personal question, for which the expected response is, for example, recorded in a user profile of the driver of the motor vehicle. Which driver is currently sitting in the driver's seat of the motor vehicle, can, for example, be recognized by a personalized vehicle key and/or be captured and identified by way of a camera device in the motor vehicle interior.

Alternatively or additionally thereto, the request can be taken from a preset subject area. Thus, a driver interested in vehicles can, for example, get stated a request from the subject area of motor vehicles if he, for example, wishes a request, which complies with his personal interest in vehicles.

Alternatively or additionally, the request can be taken from a subject area to the current vehicle environment. For example, the request can be directed to a current weather situation, to objects in an environment of the motor vehicle and/or a geographic localization of the motor vehicle at a current point of time. For example, such a request could be: "On which road is the motor vehicle currently driving?" or "What's the weather at present?".

Herein, the request is preferably selected from a plurality of possible requests. For example, multiple requests can be available, which can be received and output one after the other or in any order after providing the transition signal.

Thus, the method is versatile such that indefinitely many and diverse requests in the form of the request signal can be received.

In an additional form of configuration, it is provided that the output device includes a speaker device. If this is the case, the request is always provided as an audio output, that is as an acoustically capturable request, in the motor vehicle. The advantage hereof is in that a currently still sleeping driver can be woken up hereby such that, when he fast awakes and is mentally present, he can be immediately estimated as fit to drive by the correct response to the request. This can allow an immediate transition from the highly automated driving mode to the less automated driving mode without problem. Herein, the speaker device is preferably fixedly integrated in the motor vehicle, but can alternatively be configured as a speaker device of the mobile terminal of the driver, for example, his smartphone. Hereby, the request signal is finally output in the form of the request in particularly simple manner easily comprehensible and accessible for the driver.

A further advantageous form of configuration provides that the request includes a display on a display device in the motor vehicle. This display device can, for example, be formed as a screen, in particular as a touch-sensitive screen, in the motor vehicle. The display device can be a component of the motor vehicle and/or be included by the mobile terminal positioned in the motor vehicle. In particular, at least one preset static and/or dynamic picture is displayed by way of the display.

Thus, an image can, for example, be displayed, such that the request is for example: "Is a motor vehicle presented on the displayed image?". Then, the correct response "yes" or "no" would be expected as the response signal. Preferably, the question underlying the request is acoustically output by way of the speaker device and the display is output on the display device in addition thereto.

Thus, the request can comprise two partial requests, in particular an acoustically output and a visually output partial request, wherein both partial requests together form the request to the driver. Alternatively, the request can only be visually output by way of the display.

Alternatively or additionally thereto, a request can be provided, which is aimed at knowing and/or associating anything on the displayed picture. For example, the request can be: "What is the number presented in blue on the image?". For example, the correct response hereto could be: "The number 3 is presented in blue" or simply only "three".

Alternatively or additionally to such static images, dynamic pictures can be presented. For example, in the form of a short video sequence. Multiple static and/or dynamic pictures can be presented, such that the correct response aims at a concrete mention of one of the shown pictures. Hereby, objectively easily evaluable and optionally even automatically evaluable requests can be generated, which nevertheless reliably allow a check of the fitness to drive of the driver.

An additional form of configuration provides that the capturing device is formed as a microphone device, which captures the response signal as an acoustic signal. Thus, it is preferably provided that both the request and the response signal as the response are each acoustically perceivable, and thus an information exchange in natural speech occurs. Thus, the communication with and from the driver is based on natural speech. Preferably, the microphone device is a microphone device of the motor vehicle, but can alternatively or additionally be formed as a microphone device of the mobile terminal of the driver, which is positioned in the motor vehicle. Hereby, the response of the driver to the request is simplified since he, for example, does not have to operate an operating element in the motor vehicle, but can directly provide the response signal by a spoken response.

In an advantageous form of configuration, it is provided that the evaluation criterion considers a pronunciation, a response time and/or a clarity of the response signal. Rules are recorded in the evaluation criterion, which not only check the purely content-related response of the driver, but additionally analyze the features of the response signal. For example, an unclear pronunciation, an extended response time and/or a general unclarity of the response signal and/or in a type of the response to the question by the response included by the response signal can allow conclusions that the driver is, for example, drowsy or is under the influence of medicaments or intoxicants. The consideration of these criteria, that is the criteria of pronunciation, response time and/or clarity of the response signal, can thus result in an accurate determination of the fitness-to-drive value. In particular, a particularly differentiated determination of the fitness-to-drive value becomes possible.

Furthermore, a form of configuration of the disclosure provides that if the determined fitness-to-drive value is less than or equal to the preset fitness-to-drive limit value, a further request signal is received and a further request characterized by the transferred further request signal is output. Thereupon, the method steps c to f are performed for this further request. Thus, it is possible that even upon a response signal not corresponding to the expected response, the manual intervention of the driver is not immediately denied. Thus, a second chance can be given to the driver, which, for example, is reasonable whenever the driver has previously slept and needs a few seconds to be again fully ready to perceive.

Preferably, the further request signal is a request signal deviating from the first request signal. However, it can alternatively be provided that the same question, that is the same request signal, is again received. It can be provided that, for example, after maximally three different request signals, which each have not been responded to with the expected response, a fitness-to-drive value less than the fitness-to-drive limit value is automatically determined, and disabling any intervention of the driver in the longitudinal and/or lateral guidance then occurs and the motor vehicle is specifically decelerated to stop, that is, for example, drives to a roadside and is there secured in controlled manner.

A further particularly advantageous form of configuration provides that the fitness-to-drive value is determined by a human person. This human person is, for example, in a facility arranged outside of the motor vehicle, wherein a communication link exists between this facility and the motor vehicle. This communication link can already exist before providing the transition signal, since the facility arranged outside of the motor vehicle, for example, represents a supervising facility for the motor vehicle driving in highly automated manner. Alternatively, the communication link can be established for performing the method and thus, for example, be established only after providing the transition signal and again be disconnected after termination of the method.

The human person is in particular qualified such that he can enable or disable the longitudinal and/or lateral guidance of the motor vehicle for the manual intervention of the driver by way of an input into an input device. Thus, the human person represents a type of technical supervision, who, by determining the fitness-to-drive value, comes to realize that the current mental state of the driver indicates its fitness to drive or not. For example, after the fitness to drive of the driver has been recognized, the human person can enable the manual takeover of the motor vehicle by the driver by an input device available to him, that is by way of an input at the input device. This means that the human person decides and thereupon emits a signal, after the reception of which in the motor vehicle the longitudinal and/or lateral guidance of the motor vehicle is enabled for the manual intervention of the driver or not.

For example, if the input of the human person results in disabling the manual intervention of the driver, automatic control of a safe state of the motor vehicle can, for example, occur such that it is, for example, decelerated to the stop.

Such an emergency stop is, for example, effected in that the motor vehicle is autonomously directed from a current drive on a highway to a breakdown lane of the highway and is there decelerated up to the stop.

By evaluating the fitness to drive by a human person, it is ensured that purely technically difficultly recognizable details such as, for example, an unexpectedly unclear or confused seeming response of the driver is evaluated as a response signal, which results in a fitness-to-drive value, which is less than or equal to the fitness-to-drive limit value such that the manual interventions can be blocked for the corresponding driver. Finally, by resorting to a human person as the evaluator of the fitness to drive, it is excluded that the longitudinal and/or lateral guidance of the motor vehicle is allowed to a driver unfit to drive, for example, by a wrong decision of a purely computer-controlled system, although he is, for example, currently in a mental state unsuitable thereto.

A further form of configuration provides that the request signal is transferred to the motor vehicle by a facility arranged outside of the motor vehicle and/or the determination of the fitness-to-drive value is effected in the facility arranged outside of the motor vehicle. In this facility arranged outside of the motor vehicle, the human person can, for example, be positioned, who evaluates the fitness-to-drive value. Alternatively or additionally thereto, a computer can be provided in the external facility, that is thus, for example, an evaluation device, which is formed to perform the fitness-to-drive evaluation, that is to perform the method steps d to f of the method. Already the request signal can be provided by the external facility. Hereby, it is prevented that the required check of the fitness to drive, which is only effected internal to motor vehicle, is erroneous, for example, by a system error in a control device of the motor vehicle, and a driver unfit to drive can perform the manual intervention. Because, an external power for checking the fitness to drive is always engaged, be it the human person or the evaluation device of the facility arranged outside of the motor vehicle.

Although the method is inherently formed to be completely executed in the motor vehicle itself, it is preferably formed such that only the method steps a, b and c are, for example, effected in the motor vehicle itself, whereas the remaining method steps as well as optionally also providing the request signal are effected external to vehicle. Alternatively or additionally thereto, the request signal can be recorded in the motor vehicle itself and thus not be received from the facility arranged outside of the motor vehicle.

The communication link between the motor vehicle and the facility arranged outside of the motor vehicle or the human person and his input device is preferably effected via a wireless communication link, for example, via a wireless local area network (WLAN for Wireless Local Area Network), a Bluetooth link and/or a mobile data network, for example, based on the mobile radio standard Long Term Evolution (LTE), Long Term Evolution Advanced (LTE-A) or Fifth Generation (5G).

The motor vehicle according to the disclosure comprises a control device, which is formed to operate the motor vehicle in an at least highly automated driving mode. In addition, the method is formed to perform the method steps provided for the motor vehicle according to the described method according to the disclosure. The advantageous forms of configuration described in context of the method according to the disclosure and the advantages thereof correspondingly apply, if applicable, to the motor vehicle according to the disclosure.

The control device of the motor vehicle in particular comprises a processor device, which is configured to perform the corresponding steps of the method according to the disclosure.

The motor vehicle according to the disclosure is preferably configured as an automobile, in particular as a passenger car or truck, or as a passenger bus or motorcycle.

The control device for the motor vehicle also belongs to the disclosure. The control device can comprise a data processing device or a processor device, which is configured to perform a form of configuration of the method according to the disclosure. Hereto, the processor device can comprise at least one microprocessor and/or at least one microcontroller and/or at least one FPGA (Field Programmable Gate Array) and/or at least one DSP (Digital Signal Processor). Furthermore, the processor device can comprise a program code, which is configured to perform the form of configuration of the method according to the disclosure upon execution by the processor device. The program code can be stored in a data storage of the processor device.

The disclosure also includes the combinations of the features of the described forms of configuration. Thus, the disclosure also includes realizations, which each comprise a combination of the features of multiple of the described forms of configuration if the forms of configuration have not been described as mutually exclusive.

In the following, embodiments of the disclosure are described. Hereto, there shows:

FIG. 1 a schematic representation of a motor vehicle on a highway; and

Figure 2:
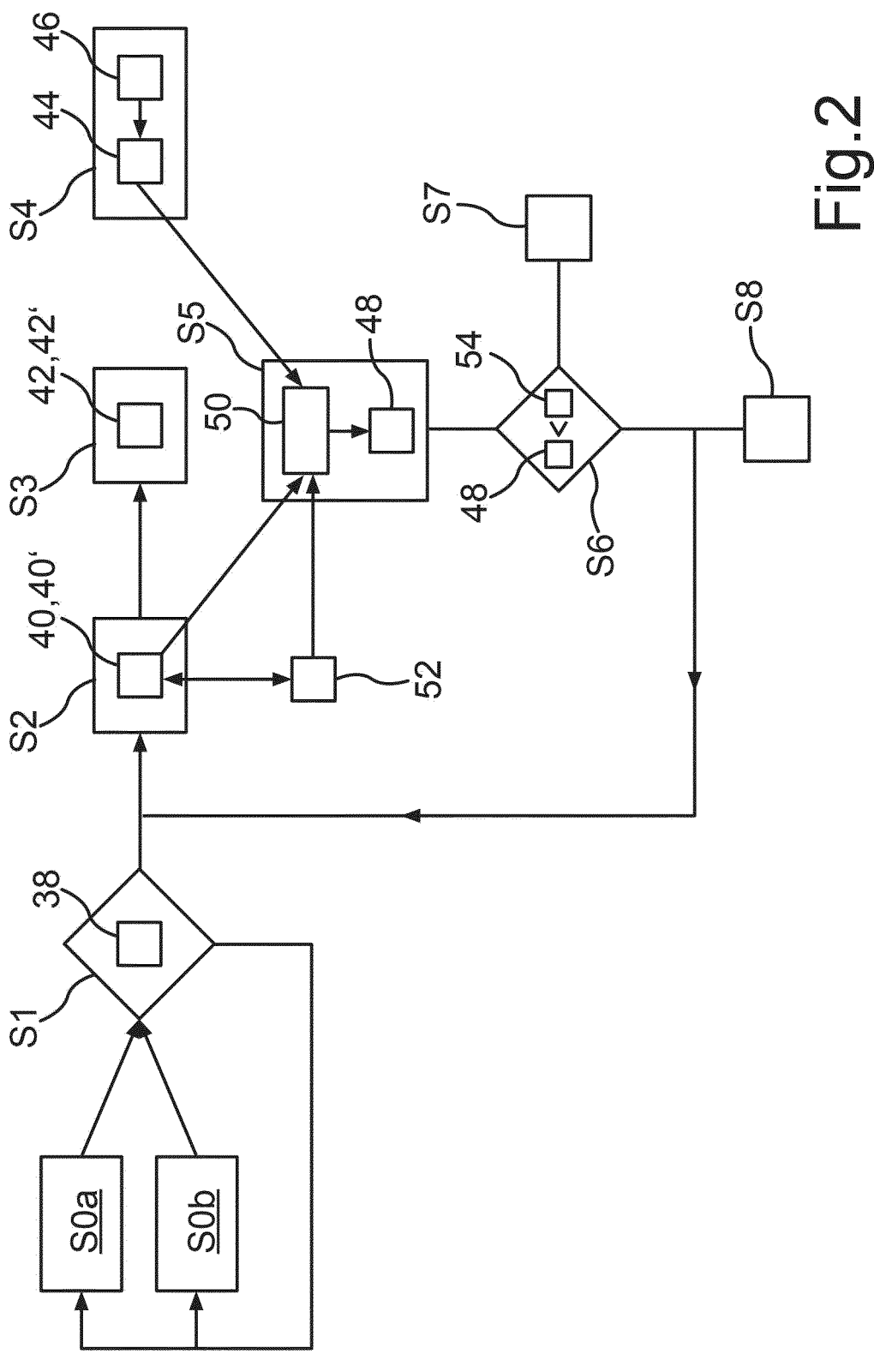

FIG. 2 a signal flow graph of a method for checking a fitness to drive of a driver of a motor vehicle in schematic representation.

The embodiments explained in the following are advantageous embodiments of the disclosure. In the embodiments, the described components of the embodiments each represent individual features of the disclosure to be considered independently of each other, which also each develop the disclosure independently of each other. Therefore, the disclosure also is to include combinations of the features of the embodiments different from the illustrated ones. Furthermore, the described embodiments can also be supplemented by further ones of the already described features of the disclosure.

In the figures, identical reference characters each denote functionally identical elements.

In FIG. 1, a motor vehicle 10 is outlined, which currently drives on a highway 12. The highway 12 comprises a breakdown lane 14. In addition, further vehicles 16 drive on the highway 12. The motor vehicle 10 is formed to be operated at least in a highly automated driving mode by way of a control device 18 of the motor vehicle 10. Thus, the motor vehicle 10 is formed at least for operation in a driving mode according to SAE level 4. In addition, the motor vehicle 10 can be formed to be operated in fully automated manner, thus in a driving mode according to SAE level 5. The control device 18 of the motor vehicle 10 is formed to control a longitudinal and/or lateral guidance of the motor vehicle 10. In addition, the motor vehicle 10 is formed to be manually operated by a driver of the motor vehicle 10, wherein the driver can manually intervene in the longitudinal and/or lateral guidance of the motor vehicle 10 in such a driving mode. The motor vehicle 10 is currently in a highly automated driving mode according to SAE level 4 on the highway 12. Thus, the driver of the motor vehicle 10 currently does not have any tasks at all with driving relation. It is either not demanded from him to be able to manually intervene in the longitudinal and/or lateral guidance of the motor vehicle 10 at any time, as it is demanded in a less automated driving mode, for example, according to SAE level 3.

The motor vehicle 10 includes an evaluation device 20, an output device 22, a capturing device 24, an operating element 26 as well as a communication interface 28. Here, the output device 22 includes a speaker device and the capturing device 24 is formed as a microphone device. The output device 22 can additionally include a display device in the motor vehicle 10, which is, for example, configured as a touch-sensitive screen or as a pure display device. Preset static and/or dynamic pictures can be displayed on the display device. The operating element 26 can be formed as a rotary pushbutton, knob, button and/or element on the touch-sensitive screen. The evaluation device 20 is a computing device.

A facility 30 is arranged outside of the motor vehicle 10. It is located spatially separated from the motor vehicle 10 and is here configured external to motor vehicle and thus not belonging to the motor vehicle 10 or one of the vehicles 16.

The facility 30 includes the evaluation device 20, the output device 22, the capturing device 24 as well as the communication interface 28. In addition, a human person 32 is in the facility 30, who can operate an input device 34. A communication link 36 is established between the communication interface 28 of the motor vehicle 10 and the facility 30. The communication link 36 is a wireless link, preferably via an Internet link and/or a mobile data network.

In FIG. 2, individual method steps of a method for checking the fitness to drive of the driver of the motor vehicle 10 are outlined. First, a transition signal 38 is provided, which characterizes a change from a highly automated driving mode of the motor vehicle 10 to a driving mode less automated compared thereto. In a method step S0A, this transition signal 38 is automatically provided considering a current driving route. Alternatively or additionally thereto, it is manually activated by the driver of the motor vehicle 10 by way of actuation of the operating element 26 in the motor vehicle 10 in a method step S0B. By the actuation of the operating element 26, it is expressed by the driver that he wishes that the motor vehicle 10, for example, changes into a driving mode associated with the SAE level 3. In this driving mode less automated compared to the highly automated driving mode, it is always expected from the driver that he can intervene in the longitudinal and/or lateral guidance of the motor vehicle 10. For this reason, whenever the transition signal 38 is identified, a check of the fitness to drive of the driver is required. The identification of the transition signal 38 is effected in a method step S1.

If the transition signal 38 has been identified, a request signal 40 is received in a method step S2. The request signal 40 is received in the motor vehicle 10 from the facility 30 via the communication link 36. Alternatively, the request signal 40 can, for example, be generated by the control device 18 of the motor vehicle 10 and be received by the evaluation device 20 of the motor vehicle 10.

In a next method step S3, outputting a request 42 characterized by the transferred request signal 40 is effected in the motor vehicle 10. This is effected by way of the output device 22. Thus, the output of the request 42 is effected by way of the speaker device and/or the display device in the motor vehicle 10.

The request 42 can ask for information characterizing a current point of time, such as, for example, a today's date, date of the week, a clock time, a year, a month, a season and/or a time of day such as, for example, a morning, forenoon, noon, afternoon, evening and/or a night. Alternatively or additionally thereto, the request 42 can include a display on the display device as the output device 22 like the output of at least one preset static and/or dynamic picture.

In a method step S4, a response signal 44 is captured, which describes a response 46 of the driver to the output request 42. Herein, the response 46 is preferably provided by the driver as an audio signal, that is as the acoustically perceivable response signal 44, which is captured by the capturing device 24 formed as a microphone device. Alternatively or additionally thereto, the response signal 44 can be captured in the form of an actuation of the operating element 26 in the motor vehicle 10, for example, by touching an element on the touch-sensitive screen of the display device.

In a method step S5, determination of a fitness-to-drive value 48 quantifying a fitness to drive of the driver is effected. This is effected by evaluating the captured response signal 44 while applying a preset evaluation criterion 50. Herein, it is examined if the captured response signal 44 describes an expected response 52 associated with the received request signal 40. Thus, at least the captured response signal 44, the received request signal 40 and the expected response 52 are taken into account. In addition, the evaluation criterion can consider a pronunciation, a response time and/or a clarity of the response signal 44. In particular, by applying the evaluation criterion 50, it is determined whether or not a fitness to drive of the driver is present. Therefore, it is examined in a method step S6 if the determined fitness-to-drive value 48 is greater than a preset fitness-to-drive limit value 54. If this is the case, permitting the manual intervention of the driver in the longitudinal and/or lateral guidance of the motor vehicle 10 is effected in a method step S7.

Thus, to each request 42 and thus to each request signal 40, an expected response 52 exists, which is to be regarded as the single correct response 46 to the request 42. The question stated by way of the request 42 is thus always a uniquely answerable question. A check of the response signal 44 to the effect to examine a voice of the driver such that the response signal 44 is compared to stored audio data of the driver recorded in the motor vehicle 10 or in the facility 30 is not effected. Namely, a check of the response signal 44 occurring at content level always occurs. Within the scope of the content-related check, it is checked if the received request signal 40 is actually responded to with the response signal 44. Thus, an analysis of the voice of the driver is not effected, but a content-related check of the response 46 included by the response signal 44 to the request 42.

If it is determined that the fitness-to-drive value 48 is less than or equal to the preset fitness-to-drive limit value 54, the method can be again performed according to steps S2 to S7. Hereto, a further request signal 40' is received and a further request 42' characterized by the transferred further request signal 40' is output. The remaining method steps, that is the method steps S4 to S7, are performed for the further request signal 40'. Such a repetition of the method with multiple different request signals 40' can be limited to a certain number of iterations. If it is again and again determined that the fitness-to-drive value 48 is less than or equal to the preset fitness-to-drive limit value 54, disabling any intervention of the driver in the longitudinal and/or lateral guidance of the motor vehicle 10 can occur, which is here outlined with a method step S8. If this is the case, deceleration of the motor vehicle 10 to a safe stop, for example, on the breakdown lane 14 of the highway 12, for example, occurs.

The evaluation of the fitness-to-drive value 48, that is the method step S5, is performed by a human person 32. After the evaluation in the method step S6, the person 32 can cause the longitudinal and/or lateral guidance of the motor vehicle 10 to be enabled for the manual intervention of the driver by an input at the input device 34, as it is the case in method step S7, or to be disabled, as it is, for example, the case in method step S8. The human person 32 thus represents a technical supervision, who evaluates the fitness to drive of the driver. Generally, both the emission of the request signal 40 to the motor vehicle 10 and/or the determination of the fitness-to-drive value 48 in step S5 can be effected outside of the motor vehicle 10, namely in the facility 30 and by performing by the person 32.

Overall, the examples show a procedure for transfer of the vehicle guidance to a previously mentally absent driver in that it is checked whether or not the driver is currently fit to drive. In order to allow takeover of vehicle tasks to the driver, that is an intervention in the longitudinal and/or lateral guidance of the motor vehicle 10, also beyond a stop, it always is to be ensured that a driver, for example, previously not subject to perception, for example, if the motor vehicle 10 is driven in the highly automated driving mode, at the point of time of takeover of the driving task, is also mentally actually capable thereof. Because unfitness to drive can, for example, exist due to drowsiness or the influence of medicaments or intoxicants. Since a complete check of the fitness to drive by the motor vehicle 10 itself is neither possible nor legally responsible and thus not reasonable, a use of present vehicle technology as well as the facility 30 is provided, wherein a technical supervision in the form of the human person 32 is enabled to check the suitability of the driver and optionally to enable a continuation of the drive of the motor vehicle 10 without stop. Here, the fitness to drive is understood by the suitability of the driver, wherein it exists at a fitness-to-drive value 48 of greater than the fitness-to-drive limit value 54.

After a confirmation by the driver, that is, for example, by a manual operation of the operating element 26 in step SOB, at least one connection in natural speech is established, which is here effected via the communication link 36, in addition to an already existing communication link 36 between the person 32 in the facility 30 and the motor vehicle 10. Via this connection in natural speech, the driver and the person 32 can communicate. The person 32, that is the technical supervision, can then inform himself about a mental state of the driver in that the person 32 talks to the driver. Here, a simple question, but also a riddle to be solved is, for example, conceivable as the request 42. Optionally, the request 42 can be effected based on image data in the infotainment system, that is on the display of the display device of the motor vehicle 10.

If the person 32 gets to the realization that the mental state of the driver is suitable, he can enable the manual takeover by an input on the input device 34. Thereby, it is prevented that the motor vehicle 10 has to adopt a safe state in the form of a stop before terminating the highly automated driving mode, such that a smooth transition to the driving mode less automated compared to the highly automated driving mode is effected. This finally allows that the driver can change from the highly automated driving mode into the less automated driving mode without interruption, whereby a comfort and safety gain is caused. The whole thing is technically variably effected since only the transfer of the preferred speech communication between the person 32 and the driver of the motor vehicle 10, here via the communication link 36, has finally to be ensured. Herein, it is relevant that the person 32 decides if the manual intervention of the driver in the longitudinal and/or lateral guidance of the motor vehicle 10 is enabled or disabled. Hereby, a message is finally created by a computer, that is the evaluation device 20, based on the input of the person 32 by way of the input device 34, which enables the motor vehicle 10 to cancel disabling of the manual takeover for a preset time or not. Thus, a possibility is present that the manual intervention is actually enabled or disabled in the motor vehicle 10 controlled by the person 32 in the facility 30 by way of the input device 34. Hereto, corresponding signals for the communication link 36 are transferred to the motor vehicle 10 from the facility 30.

The method steps S5 to S8 can be performed by the evaluation device 20 in the motor vehicle 10 itself or by the evaluation device 20 of the facility 30.

Patent Cooperation Treaty (PCT) patent application no. PCT/EP2022/059177, filed Apr. 7, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for checking a fitness to drive of a driver of a motor vehicle, comprising:
   identifying a transition signal from a first driving mode of the motor vehicle to a second driving mode, wherein the second driving mode is less automated compared to the first driving mode;
   after the transition signal has been identified, receiving a request signal and outputting a request characterized by the request signal in the motor vehicle by way of an output device, wherein the request includes displaying at least one predetermined picture on a display device in the motor vehicle, and wherein the request includes an acoustic signal that requests characterization of an object included in the picture and having a color that is specified in the acoustic signal;
   capturing a response signal that describes a response of the driver to the request, by way of a capturing device;
   determining a fitness-to-drive value that quantifies the fitness to drive of the driver by evaluating the response signal while applying a preset evaluation criterion, including checking if the response signal describes an expected response associated with the request signal;
   checking if the fitness-to-drive value is greater than a preset fitness-to-drive limit value; and
   if the fitness-to-drive value is greater than the preset fitness-to-drive limit value, permitting a manual intervention of the driver in a longitudinal or lateral guidance of the motor vehicle.

2. The method according to claim 1, wherein the transition signal is provided in automated manner based on a current driving route or is manually activated in the motor vehicle by way of an operating element.

3. The method according to claim 1, wherein the request asks for information characterizing a current point of time.

4. The method according to claim 1, wherein the output device includes a speaker device.

5. The method according to claim 1, wherein the capturing device includes a microphone device that captures the response signal as an acoustic signal.

6. The method according to claim 5, wherein the preset evaluation criterion considers a pronunciation, a response time, or a clarity of the response signal.

7. The method according to claim 1, further comprising:

if the fitness-to-drive value is less than or equal to the preset fitness-to-drive limit value, receiving a further request signal;

outputting a further request characterized by the further request signal;

capturing a response signal that describes a response of the driver to the further request, by way of the capturing device;

determining a further fitness-to-drive value that quantifies the fitness to drive of the driver by evaluating a further response signal while applying the preset evaluation criterion, including checking if the further response signal describes a further expected response associated with the further request signal;

checking if the further fitness-to-drive value is greater than the preset fitness-to-drive limit value; and if the further fitness-to-drive value is greater than the preset fitness-to-drive limit value, permitting the manual intervention of the driver in the longitudinal or lateral guidance of the motor vehicle.

8. The method according to claim 1, wherein the fitness-to-drive value is determined by a human person who enables or disables the longitudinal or lateral guidance of the motor vehicle for the manual intervention of the driver by way of an input at an input device.

9. The method according to claim 1, wherein the request signal is transferred to the motor vehicle from a facility outside of the motor vehicle or determination of the fitness-to-drive value is effected in the facility outside of the motor vehicle.

10. The method according to claim 1, further comprising:

identifying the driver of the motor vehicle based on a personalized vehicle key and/or a camera device in a motor vehicle interior, wherein the expected response is to a question that is personal to the driver of the motor vehicle identified by the identifying, and wherein the expected response is associated with the request signal and recorded in a user profile of the driver of the motor vehicle that is associated with the driver of the motor vehicle identified by the identifying.

11. The method according to claim 1, further comprising:

receiving a signal transmitted from outside of the motor vehicle, wherein the manual intervention of the driver in the longitudinal or lateral guidance of the motor vehicle is permitted in response to receiving the signal transmitted from outside of the motor vehicle.

12. A motor vehicle comprising:

a processor; and a storage device storing program code that, when executed by the processor, causes the processor to:

identify a transition signal from a first driving mode of the motor vehicle to a second driving mode, wherein the second driving mode is less automated compared the first driving mode;

after the transition signal has been identified, receive a request signal and outputting a request characterized by the request signal in the motor vehicle by way of an output device, wherein the request includes displaying at least one predetermined picture on a display device in the motor vehicle, and wherein the request includes an acoustic signal that requests characterization of an object included in the picture and having a color that is specified in the acoustic signal;

capture a response signal that describes a response of a driver to the request, by way of a capturing device;

determine a fitness-to-drive value that quantifies a fitness to drive of a driver by evaluating the response signal while applying a preset evaluation criterion, including checking if the response signal describes an expected response associated with the request signal;

check if the fitness-to-drive value is greater than a preset fitness-to-drive limit value; and if the fitness-to-drive value is greater than the preset fitness-to-drive limit value, permit a manual intervention of the driver in a longitudinal or lateral guidance of the motor vehicle.

13. The motor vehicle according to claim 12, wherein the program code, when executed by the processor, causes the processor to identify the driver of the motor vehicle based on a personalized vehicle key and/or a camera device in a motor vehicle interior, wherein the expected response is to a question personal to the driver of the motor vehicle that is identified based on the personalized vehicle key and/or the camera device in the motor vehicle interior, and wherein the expected response is associated with the request signal and recorded in a user profile of the driver of the motor vehicle that is identified based on the personalized vehicle key and/or the camera device in the motor vehicle interior.

14. The motor vehicle according to claim 12, wherein the program code, when executed by the processor, causes the processor to receive a signal transmitted from outside of the motor vehicle, wherein the manual intervention of the driver in the longitudinal or lateral guidance of the motor vehicle is permitted in response to receiving the signal transmitted from outside of the motor vehicle.

* * * * *